Patented May 19, 1953

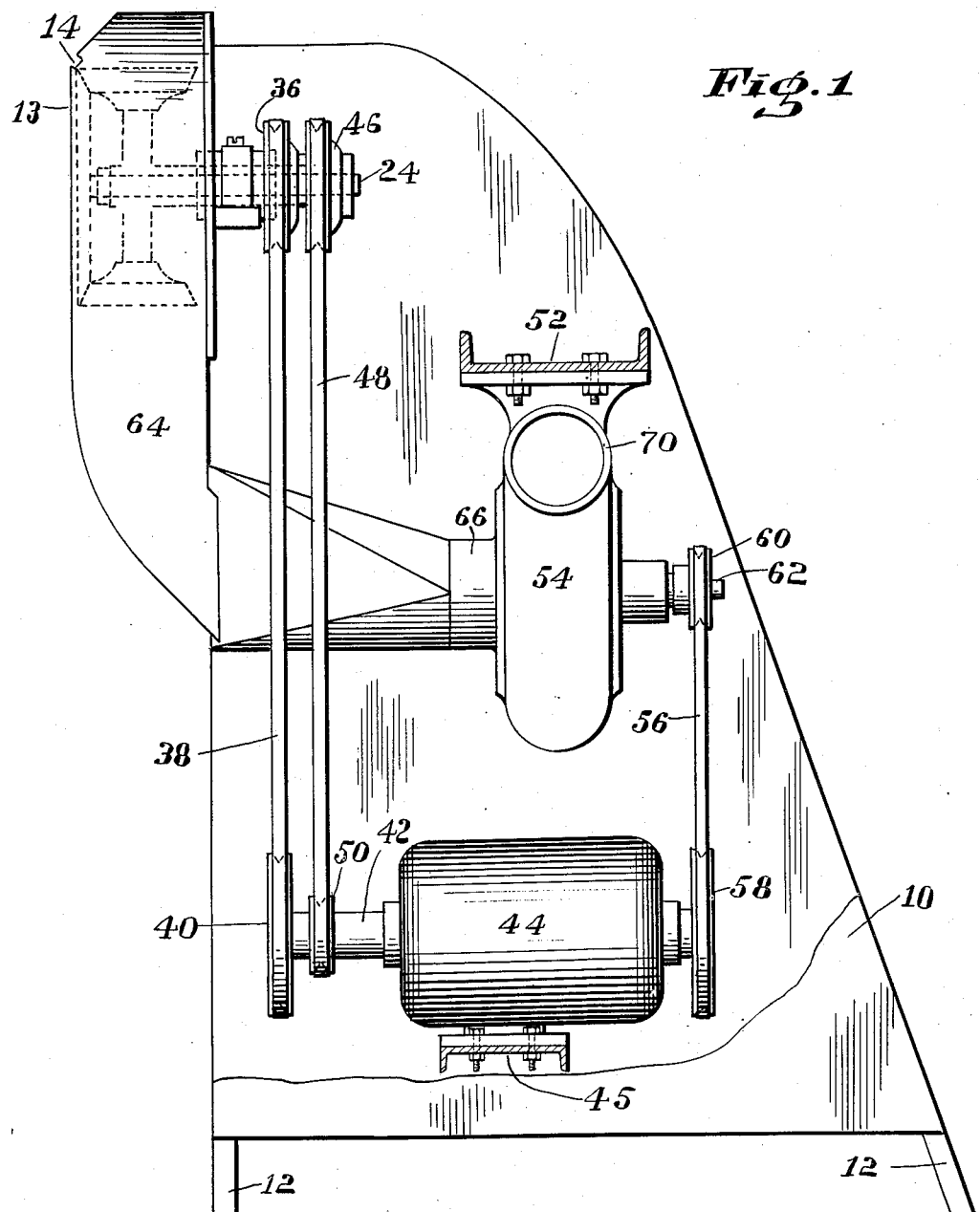

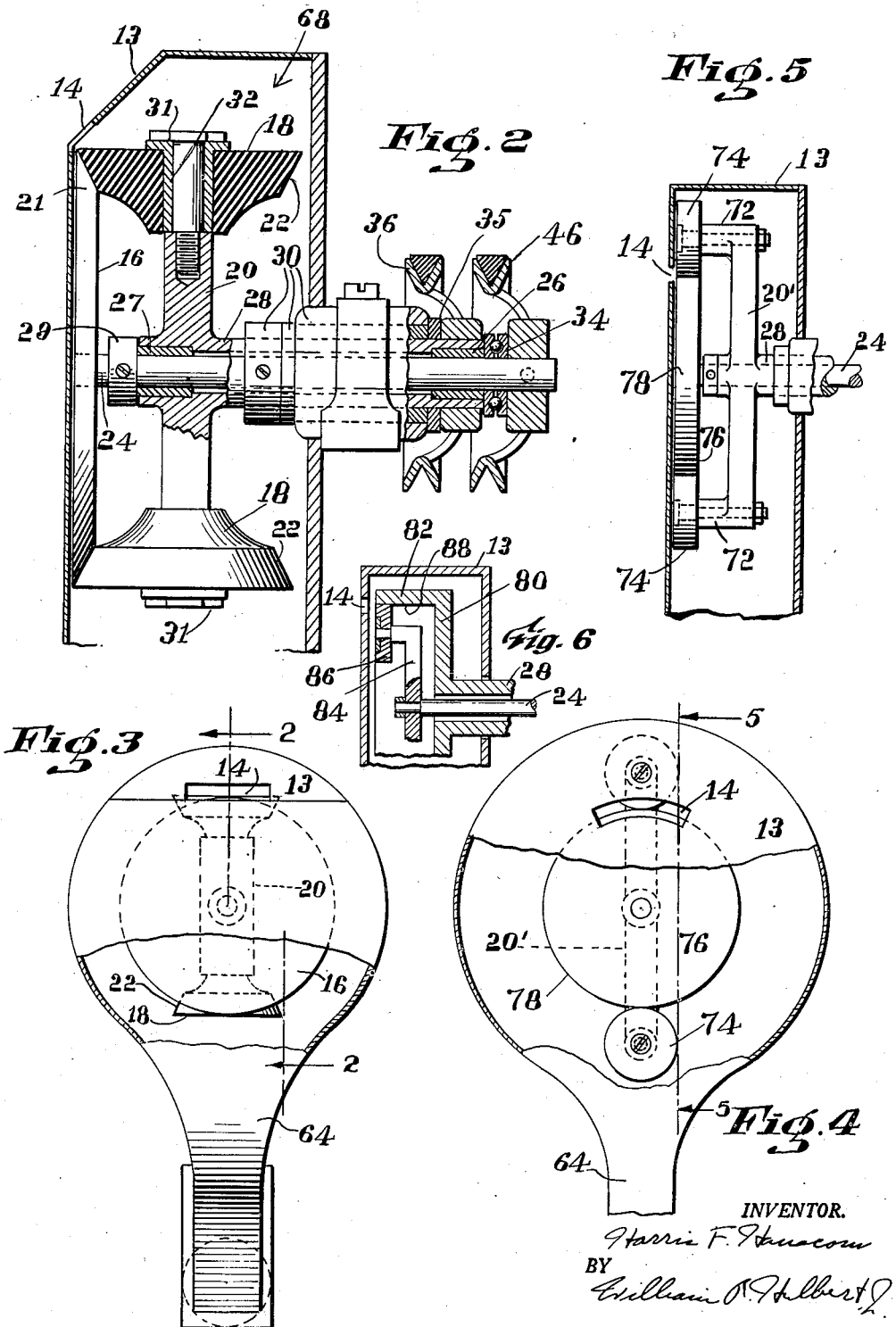

2,638,623

UNITED STATES PATENT OFFICE 2,638,623

DRY PICKER FOR POULTRY

Harris F. Hanscom, Barrington, R. I., assignor to Ajax Pickers, Inc., Narragansett, R. I., a corporation of Rhode Island Application March 7, 1950, Serial No. 148,241

8 Claims. (Cl. 17—11.1)

This invention relates to poultry plucking. More particularly it is concerned with a machine for dry-picking all kinds of fowl, that is to say without the necessity for the usual scalding process.

The plucking of fowl requires two basic motions, classically performed by hand, namely, grasping the feathers and then pulling them from the bird. Heretofore, so far as I am aware, it has been proposed to dry-pick poultry by machines which simulate these two fundamental manual motions by means of a pair of plucking elements movable to and away from the bird and to and away from each other, so as first to clamp the feathers and second to pull the feathers from the bird. To achieve these motions mechanically it has been thought necessary to employ an oscillating or reciprocatory motion on the part of at least one of the plucking elements.

Obviously, any device employing such oscillating or reciprocatory movement would, of necessity, be complex and expensive to build and subject to frequent breakdown because of excessive vibrations occurring during its use.

I have discovered that the fundamental feather-plucking motions may be performed by machine, employing an entirely new principle and mode of operation, eliminating all reciprocating or vibrating parts and accomplishing the picking in a continuous, smooth operation.

Accordingly, the principal object of the invention is to provide a dry-picker which will be both rugged in service and relatively simple and inexpensive to manufacture and which will dry-pick the birds clean under a variety of feather conditions.

A further object of the invention is to provide a poultry plucking machine which has a minimum of moving parts and which will be economical in the use of power.

Still another object of the invention is to provide a machine of the type described in which the feather-gripping and releasing action is achieved in a novel and much improved manner eliminating any oscillating or reciprocating parts.

With these and other objects in view, generally speaking, the invention is featured by the provision of a plucking head having a pair of plucking members movable past a plucking station for working upon a bird, one member presenting a feather gripping surface and the other member having a cooperating surface arranged to roll on the first-named surface in the direction of movement thereof as the same passes the station to gather and clamp between the cooperating surfaces feathers presented thereto, to pluck the same by movement of both members in unison away from said station while the feathers are so clamped, and to release the plucked feathers by further rolling movement of the second member.

In one specific preferred embodiment of the invention, I provide as one of the plucking members a rotatable wheel having an inwardly beveled rim forming a continuous feather gripping surface. Arranged to rotate coaxially with and more rapidly than the wheel, are one or more cooperating feather gripping members presenting a surface or surfaces in rolling contact with the beveled surface of the wheel. Since the second named members operate at a higher speed than the wheel there will be at all times relative motion therebetween so that the feathers of a bird placed in close proximity to the rotating beveled edge at any given location will be gripped, pulled and then released each time a rolling member passes the stated location. The cooperative action of the rotating gripping surface of the wheel and the feather gripping surface of the other plucking member rolling thereon thus may be said first to gather and clamp the feathers between the two surfaces and then by brief movement in unison away from the bird while the feathers are so clamped to pluck the feathers. Further motion of the rolling member along the surface of the wheel serves to release the plucked feathers to be disposed of in any suitable manner, such as by a blower.

Alternatively I may employ for one of the plucking members a rotatable cylindrical disc having a rim whose surface is parallel to its axis and arranged to cooperate with a second plucking member having one or more rollers in rolling engagement with said surface, said second member rotating more rapidly and co-axially therewith. The gripping surface of the disc in this case may be either outwardly or inwardly disposed and the cooperating rollers correspondingly located either outwardly or inwardly of the rim of the disc, the plucking action, in either case, being performed on the same principle as before.

Other objects, advantages and features of the invention will become apparent from the following detailed description of a preferred embodiment thereof taken in connection with the accompanying drawings, in which like numerals refer to like parts in several views, and in which:

Fig. 1 is a side elevation with portions broken away illustrating one embodiment of the poultry picking machine of the invention;

Fig. 2 is an enlarged fragmentary sectional view on line 2—2 of Fig. 3 showing housed in the plucking head cover the relatively moving plucking members, namely the rotatable wheel with beveled gripping edge and a pair of rollers cooperating therewith mounted at opposite ends of a rotatable fly-bar;

Fig. 3 is a front view of a portion of the device according to Figs. 1 and 2 showing the feather admitting slot and feather exhausting conduit with portions broken away;

Fig. 4 is a front view similar to Fig. 3 of a modified form of the invention with portions broken away;

Fig. 5 is a sectional view on line 5—5 of Fig. 4 of a portion of the embodiment of Fig. 4; and Fig. 6 is a fragmentary sectional view of still a further modification of the machine of the invention.

Referring first to Figs. 1, 2 and 3, disclosing one embodiment of the invention in preferred form, the mechanism is mounted in a frame 10 standing on legs 12. The plucking head assembly proper is held within a housing 13 attached to the front of the frame 10, the housing 13 having at a selected plucking station a slotted feather admitting opening 14 closely adjacent the plucking head. As best seen in Fig. 2, the plucking head comprises a pair of plucking members consisting of a plate or disc 16 mounted to revolve in a vertical plane and a pair of rubber or composition rolls 18 rotatably mounted at opposite ends of a fly-bar 20. The plate 16 has a beveled feather gripping surface 21 which is held in rolling engagement with the corresponding beveled surfaces 22 of the rolls 18. It will be observed that the bite between the surfaces 21 and 22 occurs closely adjacent the slot 14 in the housing 10. The gripping rollers 18 are rotatably mounted at opposite ends of the fly-bar 20 by means of studs 31 and anti-friction bearings 32 and the fly-bar is arranged to revolve in a plane parallel to that of the disc 16.

The plate 16 is keyed or otherwise attached to a horizontal inner shaft 24, which is carried on anti-friction bearings 26 and 27 within an outer shaft 28, to which is affixed the fly-bar 20, the bushing 27 being retained by a collar 29. The outer shaft 28 is supported by a fixed anti-friction pillow block assembly 30.

A thrust bearing 34 and thrust washer 35 are arranged to absorb axial thrust between the inner and outer shafts, due to the pressure between the surfaces 21 and 22.

A pulley 36 is connected to rotate with the outer shaft 28 and is driven by a belt 38 from a second pulley 40 on the shaft 42 of an electric motor 44 mounted on a bracket 45 on the frame 10 as best seen in Fig. 1. The inner shaft 24 is driven by a similar pulley 46 which in turn is rotated by a belt 48 passing from a second and smaller pulley 50 on the motor shaft 42, so that the outer shaft 28 will be driven at considerably higher speed than the inner shaft 24, in this case in a ratio of 2:1.

Also mounted in the frame 10 on a bracket 52 is a blower 54 of any conventional design for pneumatically exhausting the plucked feathers. The blower 54 is likewise driven by the motor 44 by means of a belt 56 and pulleys 58 and 60, the latter being keyed to the shaft 62. Suitable air conduits 64 connect the intake 66 of the blower 54 to the chamber 68 of the plucking head containing the plucking members 16 and 18, so that the plucked feathers will be drawn through the conduit 64 and blown into a suitable container through an outlet 70.

The operation of the embodiment of Figs. 1–3 may be described as follows:

When a bird is manipulated by hand over the slot 14 in the plucking head cover 13, suction from the blower causes the feathers to stand out from its skin and enter the slot. The action of the plucking head then pulls the feathers and releases them for disposal. The loose feathers, when dropped by the plucking head, are carried by air flow to the blower and then are exhausted into a bag or other suitable disposal receptacle. Each time a roller 18 passes the slot 14 feathers are gathered and clamped between the surfaces 21 and 22 and, during the brief moment when the surfaces are moving in unison away from the slot, the feathers are plucked. Thereafter, further rotation of the rollers 18 releases the plucked feathers which are drawn away through the conduit 64.

Now, referring to the modified embodiment of Figs. 4 and 5, the fly-bar 20' is provided with two right-angled extensions 72 on which are rotatably mounted cylindrical rollers 74. The fly-bar 20' rotates with the outer shaft 28 in the same manner as before.

To the inner shaft 24 is affixed for rotation therewith a disc 76, the outer rim 78 of which provides a smooth cylindrical gripping surface which is concentric with and equidistant from the axis of the shaft 24. The outer surface of the roller 74 is in rolling engagement with the surface 78 of the disc. The rotating members again are arranged for plucking feathers entering through the slot 14 in the housing 13, the feathers being gripped, pulled and released in the same manner as in the embodiment of Figs. 1–3.

A still further modification of the invention is disclosed in Fig. 6, wherein the fly-bar of the previous embodiments is replaced by a disc 80 connected to the outer shaft 28 and having an overhanging flange 82 the inner surface 88 of which is parallel with the axis of the shaft and projects in close proximity to the feather admitting slot 14 in the plucking head cover 13. A fly-bar 84 replaces the disc of the other embodiments and is connected to the inner shaft 24. Resilient cylindrical rollers 86 mounted at the ends of the fly-bar 84 are arranged for rolling engagement with the inner surface 88 of the flange 82.

In the embodiment of Fig. 6 the shafts 24 and 28 are driven at different speeds in a manner similar to that disclosed in Fig. 1, so that the plucking members will perform the intermittent plucking operation opposite the opening 14, grasping, pulling and releasing the feathers as previously described, the fly-bar rotating more rapidly than the disc.

The fly-bar in any of the embodiments herein described and illustrated may be provided with a different number of rollers, having in mind that the same should be balanced to avoid undesirable vibrations at high speeds. It is evident that the discs numbered 16 in Figs. 1, 2, and 3, 76 in Figs. 4 and 5, and 80 in Fig. 6 need not be solid throughout but the requisite moving feather-gripping surface may be formed on the rim of any type of wheel or disc or the like. For this reason such element will be designated by the generic term "wheel" in the claims, as a matter of convenient terminology, the same being intended to mean any type of wheel or disc, solid or otherwise, adapted to perform the intended function.

It will be apparent that I have shown and described a much simplified and improved drypicker, having relatively few and rugged parts, which is capable of prolonged and hard service with relatively little likelihood of breakdown. The machine operates on quite a different principle from the earlier machines in this art, having no rapidly reciprocating unbalanced parts, but, on the contrary picking the bird in a continuous, smooth, vibration-free operation. All the rotating parts are balanced and I have found that efficient picking may be performed by revolving the plate at 400 R. P. M. and the fly-bar at 800 R. P. M.

It will be evident that other modifications of my invention will occur to those skilled in the art. For example, the edges of the plucking members may be beveled at various angles, and other means may be developed by which one rolling plucking member may be caused to roll along the moving surface of another plucking member for plucking feathers, such changes and modifications being within the spirit and scope of the present invention as defined in the appended claims.

I claim:

1. In a poultry plucking machine, the combination comprising a rotatably mounted wheel having a continuous feather-gripping surface thereon, a member rotatably mounted to revolve coaxially with said wheel and having a portion extending adjacent said feather-gripping surface, a roller rotatably mounted on said extending portion and having its surface in continuous rolling engagement with said feather-gripping surface, and driving mechanism associated with said wheel and said member for rotating said wheel and said member continuously in the same direction, said mechanism rotating said member more rapidly than said wheel to cause rolling movement of said roller on said gripping surface so that feathers presented to said surface will be momentarily gripped between said surface and said roller and plucked by movement in unison of said roller and surface and thereafter released by further rolling movement of said roller.

2. In a poultry plucking machine the combination comprising a rotatably mounted wheel having a continuous feather-gripping surface thereon, a fly-bar rotatably mounted to revolve coaxially with said wheel and in spaced relation thereto, said fly-bar having at least one portion extending adjacent said feather-gripping surface, a roller rotatably mounted on such extending portion and having its surface in continuous rolling engagement with said feather-gripping surface, and driving mechanism associated with said wheel and said fly-bar for rotating said wheel and said fly-bar continuously in the same direction, said mechanism rotating said fly-bar more rapidly than said wheel to cause rolling movement of said roller on said gripping surface so that feathers presented to said surface will be momentarily gripped between said surface and said roller and plucked by movement in unison of said roller and surface and thereafter released by further rolling movement of said roller.

3. In a poultry plucking machine, the combination comprising a rotatably mounted wheel having a continuous outwardly facing feather-gripping surface on its periphery, a member rotatably mounted to revolve coaxially with and in spaced relation to said wheel and having a portion extending adjacent said feather-gripping surface, said surface being bevelled toward said member, a roller rotatably mounted on said extending portion and having its surface extending in a direction corresponding to the bevel of said gripping surface and in continuous rolling engagement therewith, and driving mechanism associated with said wheel and said member for rotating said wheel and said member continuously in the same direction, said mechanism rotating said member more rapidly than said wheel to cause rolling movement of said roller on said gripping surface so that feathers presented to said surface will be momentarily gripped between said surface and said roller and plucked by movement in unison of said roller and surface and thereafter released by further rolling movement of said roller.

4. In a poultry plucking machine, the combination comprising a rotatably mounted wheel having a continuous outwardly facing cylindrical feather-gripping surface on its periphery, a member rotatably mounted to revolve coaxially with and in spaced relation to said wheel and having a portion extending adjacent said feather-gripping surface, a cylindrical roller rotatably mounted on said extending portion and having its surface in continuous rolling engagement with said feather-gripping surface, and driving mechanism associated with said wheel and said member for rotating said wheel and said member continuously in the same direction, said mechanism rotating said member more rapidly than said wheel to cause rolling movement of said roller on said gripping surface so that feathers presented to said surface will be momentarily gripped between said surface and said roller and plucked by movement in unison of said roller and surface and thereafter released by further rolling movement of said roller.

5. In a poultry plucking machine the combination comprising a rotatably mounted wheel having a peripheral flange, said flange having a continuous axially directed feather-gripping surface, a member rotatably mounted to revolve coaxially with said wheel and in spaced relation thereto, said member having a portion extending adjacent said feather-gripping surface and radially inwardly thereof, a roller rotatably mounted on such extending portion and having its surface in continuous rolling engagement with said feather-gripping surface, and driving mechanism associated with said wheel and said member for rotating said wheel and said member continuously in the same direction, said mechanism rotating said member more rapidly than said wheel to cause rolling movement of said roller on said gripping surface so that feathers presented to said surface will be momentarily gripped between said surface and said roller and plucked by movement in unison of said roller and surface and thereafter released by further rolling movement of said roller.

6. In a poultry plucking machine the combination comprising a pair of concentric rotatable shafts, a wheel mounted on one of said shafts to revolve therewith and having a continuous feather-gripping surface thereon, a member mounted on the other of said shafts to revolve therewith and having a portion extending adjacent said feather-gripping surface, a roller rotatably mounted on said extending portion and having its surface in continuous rolling engagement with said feather-gripping surface, and driving mechanism for rotating said shafts continuously in the same direction, said mechanism rotating the shaft carrying said member more rapidly than the other shaft to cause rolling movement of said roller on said gripping surface so that feathers presented to said surface will be momentarily gripped between said surface and said roller and plucked by movement in unison of said roller and surface and thereafter released by further rolling movement of said roller.

7. In a poultry plucking machine the combination comprising a housing having a feather-admitting slot, a wheel rotatably mounted within said housing and having a continuous feather-gripping surface thereon, said surface being arranged to revolve with an edge thereof adjacent said slot, a member rotatably mounted to revolve coaxially with said wheel within said housing and having a portion extending adjacent said feather-gripping surface, a roller rotatably mounted on said extending portion and having its surface in continuous rolling engagement with said feather-gripping surface for rolling thereon past said slot, and driving mechanism associated with said wheel and said member for rotating said wheel and said member continuously in the same direction, said mechanism rotating said member more rapidly than said wheel to cause rolling movement of said roller on said gripping surface so that feathers presented to said surface through said slot will be momentarily gripped between said surface and said roller and plucked by movement in unison of said roller and surface away from said slot and thereafter released by further rolling movement of said roller.

8. In a poultry plucking machine the combination comprising a rotatably mounted wheel having a continuous feather-gripping surface thereon, a fly-bar rotatably mounted to revolve coaxially with said wheel and in spaced relation thereto, the opposite ends of said fly-bar extending adjacent said feather-gripping surface, a roller rotatably mounted on each such extending end and having its surface in continuous rolling engagement with said feather-gripping surface, and driving mechanism associated with said wheel and said fly-bar for rotating said wheel and said fly-bar continuously in the same direction, said mechanism rotating said fly-bar more rapidly than said wheel to cause rolling movement of said rollers on said gripping surface so that feathers presented to said surface will be momentarily gripped between said surface and each of said rollers and plucked by movement in unison of such roller and surface and thereafter released by further rolling movement of such roller.

HARRIS F. HANSCOM.

References Cited in the file of this patent

UNITED STATES PATENTS

| Number | Name | Date |
|---|---|---|
| 295,050 | Ritchel et al. | Mar. 11, 1884 |
| 1,230,222 | Rieske | June 19, 1917 |
| 1,637,061 | Simons | July 26, 1927 |
| 1,674,968 | Goldstein et al. | June 26, 1928 |
| 1,923,415 | Bingham | Aug. 22, 1933 |